(12) United States Patent
Ohashi et al.

(10) Patent No.: US 6,228,533 B1
(45) Date of Patent: May 8, 2001

(54) ELECTRODES WITH IMPROVED ADHESION BETWEEN ACTIVATOR AND COLLECTOR AND METHODS OF MAKING THE SAME

(75) Inventors: Kazuyoshi Ohashi; Yoshiyuki Miyaki; Kuniyuki Goto, all of Kyoto (JP)

(73) Assignee: Atofina (FR)

( * ) Notice: Subject to any disclaimer, the term of this patent is extended or adjusted under 35 U.S.C. 154(b) by 0 days.

(21) Appl. No.: 09/125,444

(22) PCT Filed: Feb. 27, 1997

(86) PCT No.: PCT/EP97/00998

§ 371 Date: Mar. 24, 1999

§ 102(e) Date: Mar. 24, 1999

(87) PCT Pub. No.: WO97/32347

PCT Pub. Date: Sep. 4, 1997

(30) Foreign Application Priority Data

Feb. 27, 1996 (JP) .................................................... 8-039672

(51) Int. Cl.[7] ...................................................... H01M 4/62
(52) U.S. Cl. ............................................ 429/217; 429/233

(58) Field of Search ................................. 429/217, 218.1, 429/233

(56) References Cited

U.S. PATENT DOCUMENTS

| | | | |
|---|---|---|---|
| 5,415,958 | 5/1995 | Takahashi et al. | 429/217 |
| 5,565,284 | 10/1996 | Koga et al. | 429/218 |
| 5,567,539 | * 10/1996 | Takahashi et al. | 429/218.1 |
| 5,900,183 | * 5/1999 | Kronfli et al. | 429/192 |

FOREIGN PATENT DOCUMENTS

| | | |
|---|---|---|
| 2072203 | 9/1981 | (GB) . |
| 62-90863 | 4/1987 | (JP) . |
| 5-006766 | 1/1993 | (JP) . |

* cited by examiner

*Primary Examiner*—Laura Weiner
(74) *Attorney, Agent, or Firm*—Pennie & Edmonds LLP

(57) ABSTRACT

The present invention relates to electrodes consisting of an electrode activator and a metallic collector whose adhesion between the activator and the collector is improved. The electrode activator's binder is made of a fluoroplastic grafted with at least one acrylic polymer.

11 Claims, No Drawings

ELECTRODES WITH IMPROVED ADHESION BETWEEN ACTIVATOR AND COLLECTOR AND METHODS OF MAKING THE SAME

TECHNICAL FIELD

This invention relates to electrodes which can be used in batteries and cells, such as lithium-ion batteries and cells and the production method of the said electrodes.

PRIOR ART

There is a great demand for small secondary cells having a high capacity and a long life in portable instruments such as portable telephone sets, video cameras and notebook type personal computers, etc. Lithium-ion cells are future-expected secondary cells.

Known anode activator substances in the lithium-ion cell consist generally of carbonaceous materials such as coke or graphite into which the lithium ions can be doped or released reversibly (JP-A 62-90863). Usually, a powder of carbonaceous material is mixed with a suitable amount of a binder and is kneaded with a solvent in order to prepare a paste. A collector is then coated with the paste and is dried and compacted to obtain the anode.

Known cathode activator substances in the lithium-ion cell consist generally of transition metals oxides such as manganese oxide and vanadium oxide, sulfides of transition metals such as iron sulfide and titanium sulfide, or composite compounds of the above substances and lithium such as composite oxides of lithium and cobalt, composite oxides of lithium, cobalt and nickel, composite oxides of lithium and manganese. The cathode activator substance also is mixed with an electro-conductive substance (usually carbon) and a suitable amount of a binder and is kneaded with a solvent in order to prepare a paste which is then applied to a collector and is dried and compacted to obtain a cathode.

The binder for secondary battery must have a high resistance to liquids which are often used as electrolytes and to active species generated by the electrochemical reactions and also to solvents which are carried out during the manufacture of the batteries and cells. A binder which satisfies the above requirements is polyvinylidenefluoride (PVDF) resin . However PVDF resins and fluorinated resins in general have inherently poor adhesion to metals, so that the activator substance separates easily from the metallic collector for both cathode and anode and it results that an inferior cycle property of the lithium-ion cell.

JP-A-5-6766 has proposed to roughen the collectors' surface in order to increase the anchoring effect of the fluorinated resins. However, a sufficient adhesion cannot be obtained in carrying out this technique.

A copolymer of vinylidenefluoride (VF2) and a carboxyl group-containing monomer has been proposed in JP-A-6-172452. This copolymer, however, is difficult to produce industrially.

DISCLOSURE OF THE INVENTION

The present invention provides electrodes for batteries and cells whose adhesion between the electrode activator and the collector is improved so as the cycle property of the cells.

MEANS TO SOLVE THE PROBLEM

The present invention provides electrodes for cells having a layer of an electrode-forming substance comprising an electrode activator and a binder which is coated and/or bonded on a surface of a metallic collector, characterized in that the binder is a fluoroplastic to which at least one acrylic polymer is bonded, the monomer units of the-said acrylic polymer(s) consisting mainly of at least one monomer unit selected from esters of acrylic acid and/or methacrylic acid.

In the grafted fluoroplastic according to the invention, the content of the acrylic polymer is 0.1 to 20% by weight, preferably 0.2 to 20% by weight, more preferably 0.3 to 5% by weight of the grafted fluoroplastic. If the content is less than 0,1% by weight, the adhesion between the electrode activator and the collector is poor; if the content is more than 20% by weight, the binder's resistance becomes poor and an important swelling caused by the contact with the organic solvents used as electrolytes (for instance ethylenecarbonate, propylenecarbonate, dimethyl carbonate, diethyl carbonate etc) is observed. Consequently both low and high content of acrylic polymer have a bad influence on the performances of the electrodes and of the secondary cells. These drawbacks become particularly serious when the temperature is higher than 50° C.

The collector for both electrodes (anode and cathode) may be a metal foil, a metal mesh, a three-dimensional porous block or the like and is preferably made of a metal which does not easily produce an alloy with lithium as iron, nickel, cobalt, copper, titanium, vanadium, chromium and manganese or one of their alloys.

The anode activator substances can be any materials which permit doping and releasing of lithium ions and are generally carbonaceous materials including cokes such as petroleum cokes and carbon cokes, carbon blacks such as acetylene black, graphite, fibrous carbon, activated carbon, carbon fibers and sintered articles obtained from organic high polymers by burning the organic high polymer in a non-oxidative atmosphere. Metal oxides as copper oxide can also be added to the anode activator substance.

The cathode activator substances can be usual known ones as disclosed above. Some electro-conductive materials can also be incorporated in the cathode activator substance.

The fluoroplastic may be polytetrafluoroethylene, polyvinyl fluoride, polytrifluoroethylene, polychlorotrifluoroethylene, copolymer of vinylidenefluoride-chlorotrifluoroethylene, copolymer of ethylene and tetrafluoroethylene, copolymer of tetrafluoroethylene and hexafluoro propylene and polyvinylidenefluoride (PVDF). Among them, PVDF is preferably used because of its high resistance to solvents generally used in cells and active species produced and also because of its good solubility in N-methylpyrolidone which is generally used during the manufacture of batteries and cells.

For the present invention, PVDF means homopolymers of vinylidenefluoride (VF2) and copolymers of VF2 and at least another fluorinated comonomer preferably chosen among tetrafluoroethylene, hexafluoropropylene, trifluoroethylene and/or chlorotrifluoroethylene that can be used alone or in combination. The amount of VF2 is from 40 to 95% by weight and preferably from 70 to 95%. The preferred PVDFs according to the present invention have a melt flow index (MFI) of 0.01 to 300 g/10 min at 230° C. under a load of 2.16 kg.

The main monomer units of the acrylic polymer are, as said above, the esters of acrylic acid and/or methacrylic acid; they may be alkyl esters of acrylic acid or methacrylic acid as methylacrylate, ethylacrylate, methylmethacrylate, ethylmethacrylate and butylmethacrylate. The amount of these monomers in the acrylic polymer(s) is preferably more than 80% by weight of the acrylic polymer.

Preferably, the acrylic polymers have 0.2 to 20 parts by weight, preferably 1 to 10 parts by weight of carboxyl group or carboxyl anhydride groups. The monomers containing carboxyl group or carboxyl anhydride group may be unsaturated carboxylic acids as acrylic acid, methacrylic acid, crotonic acid, maleic acid, fumaric acid, alkenyl succinic acid, acrylamideglycolic acid and monoallyl-1, 2-cyclohexanedicarbonate and unsaturated carboxylic anhydride such as maleic anhydride and alkenyl succinic anhydride.

The acrylic polymers as defined above can be grafted to the fluoroplastic by graft reaction with the help of at least a peroxide effected after the polymerization of the fluoroplastic, by means of radiation or by polymerization of the fluorinated monomers (of the-said fluoroplastic) in the presence of the acrylic polymer(s).

The graft reaction with peroxide(s) is carried out in heating a mixture of the acrylic polymer and the fluoroplastic in the presence of the peroxide(s). The reaction can be carried out in molten condition or in a solvent. If a solvent is used, the acryl polymer, the PVDF and the peroxide(s) are both dissolved in a solvent and the resulting solution is heated at a temperature to which the peroxide decomposes satisfactorily. A suitable amount of peroxide(s) is typically about 0.5 to 10% by weight to the fluoroplastic. The resulting solution can be applied directly onto a collector to produce the electrode. The graft copolymer can be extracted from the solution by a reprecipitation technique, can be optionally purified by washing with a suitable solvent and used as a binder for the anode and/or the cathode.

Any known peroxides can normally be used as peroxyketals, alkylhydroperoxides, dialkylperoxides, alkylperoxyesters, dialkylperoxides, peroxydicarbonates and peroxyesters.

In the present invention, the graft reaction can be carried out simultaneously with the electrode's manufacture. When the graft reaction occurs with the help of peroxid(s), a slurry can be prepared by kneading predetermined amounts of electrode activator, of fluoroplastic, preferably PVDF as a binder, of the above acrylic polymer and peroxide(s) in the presence of a solvent. The resulting slurry is coated on a surface of the collector, dried and then press-moulded into an electrode. The slurry is heated before or after its application to the collector according to the peroxide(s) 's nature.

The binder is preferably added in a range from 1 to 30 parts, preferably 3 to 15 parts by weight to 100 parts by weight of the electrode activator. Other additives such as electro-conductive agents (copper oxide) also can be added to the electrode-forming substance.

The solvents used during the graft reaction with peroxide (s) or the solvents used to prepare the slurry to be coated on the collector can be water or organic solvents such as N-methylpyrolidone, N, N-dimethylformamide, tetrahydrofuran, dimethyl acetoamide, dimethyl sulfoxide, hexamethylsulfolamide, tetramethylurea, acetone and methylethyl ketone. These solvents can be used alone or in combination. Among them, N-methylpyrolidone is preferably used. If necessary, a dispersant can be also be used. Nonionic dispersants are preferred.

ADVANTAGES OF THE INVENTION

The present invention provides electrodes whose adhesion between the electrode activator and the collector is improved. When these electrodes are used in batteries, the capacity of discharge is not deteriorated after repeated charge-discharge cycles. The present invention is useful particularly in lithium-ion cells.

MEANS TO SOLVE THE INVENTION

EXAMPLES

Preparation Example 1

10% by weight of a PVDF homopolymer (sold by Elf Atochem under Kynar® 500, MFI: 0.03 g/10 min at 230° C. under a load of 2.16 kg), 0.2% by weight of an acrylic copolymer (MFI: 2.4 g/10 min at 230° C. under a load of 3.8 kg; comprising 100 parts by weight of methylmethacrylate and 10 parts by weight of maleic anhydride), and 0.5% by weight of benzoylperoxide were dissolved in N-methylpyrolidone. The solution was heated at 120° C. for 30 min and then was poured into methanol to collect the polymer which has precipitated.

The resulting polymer was extracted with chloroform by refluxing the polymer for 6 hours in a Soxhlet extractor to confirm that the acrylic copolymer is grafted to the PVDF. A film prepared with the extracted polymer was examined by IR spectroscopy; a clear peak at 1740 $cm^{-1}$ was found that corresponds to the absorption caused by the carbonyl groups.

Preparation Example 2

A grafted PVDF was prepared with the same procedure as in Preparation Example 1 but the PVDF homopolymer was changed to a copolymer of VF2 (90% by weight) and hexafluoropropylene (10% by weight) sold by Elf Atochem under Kynar®2800 (MFI: 0.2 g/10 min at 230° C. under a load of 2.16 kg) and benzoylperoxide was changed to t-butylperoxybenzoate.

Preparation Example 3

9% by weight of the PVDF of Preparation Example 1, 1% by weight of the copolymer of Preparation Example 2, 0.2% by weight of the same acrylic polymer of Preparation Example 1 and 0.5% by weight of benzoylperoxide were dissolved in N-methylpyrolidone; the solution was then heated at 120° C. for 30 minutes and then was poured into methanol to collect the polymer which has precipitated.

Example 1

8 parts by weight of the grafted PVDF copolymer of Preparation Example 1 (binder) was dissolved in N-methylpyrolidone and 90 parts by weight of coal pitch coke crushed in a ball mill as anode activator carrier was added to the solution in order to obtain a slurry (paste). The slurry was then coated on both sides of a copper foil of 20 $\mu$ thickness, dried at 120° C. under reduced pressure and then press-moulded to obtain an anode of 145 $\mu$ thickness and of 20 mm width.

In order to prepare a cathode, 92 parts by weight of $LiCoO_2$ as cathode activator and 6 parts of graphite as electro-conductive additive were dispersed in a solution of N-methylpyrolidone in which 8 parts by weight of the same binder that was used for the preparation of the anode was dissolved to obtain a slurry (paste). The slurry was coated on both sides of an aluminum foil of 20 $\mu$ thickness, dried at 120° C. under reduced pressure and then press-moulded to obtain anode of 175 $\mu$ thickness and of 20 mm width.

A good adhesion between these electrodes and the electrode activator was noted: the electrode activators remain on the electrode surfaces when the electrode activators deposited on the electrodes were peeled off by a cutter-knife.

The resulting cathode and anode were laminated alternately through a film of porous polypropylene of 25 $\mu$ thickness as separator to form a laminate of separator/ cathode/separator/anode/separator which was wound spirally to obtain a cylindrical electrode assembly. After lead wires were attached to respective electrodes, the electrode assembly was packed in a stainless container into which an electrolyte was poured The electrolyte is 1 M solution of $LiPF_6$ dissolved in an equivolumic mixture of propylene carbonate and 1, 2-dimethoxyethane.

In the charge-discharge test, the battery was charged with a current density of 30 mA / 1 of carbon to 4.1 V and then was discharged with the same current to 2.5 V. The same charge-discharge operation was repeated to evaluate the capacity of discharge. The results revealed that the capacity of discharge after 100 cycles was 90% of a value of 10th cycle.

Example 2

8% by weight of the PVDF used in Preparation Example 1 (Kynar500), 0.1% by weight of the acrylic polymer used in Preparation Example 1 (binder) and 0.2 parts by weight of diisopropylperoxydicarbonate were dissolved in N-methylpyrolidone. 90 parts by weight of coal pitch coke crushed in a ball mill as anode activator carrier was added to the solution to obtain a slurry (paste). The slurry was heated in a closed system to prevent solvent evaporation at 80° C. for 30 minutes and then was coated on both sides of a copper foil of 20 μ thickness, dried at 120° C. under reduced pressure and then press-moulded to obtain an anode of 140 μ thickness and of 20 mm width.

In order to prepare a cathode, 92 parts by weight of $LiCO_2$ as cathode activator and 6 parts of graphite as electroconductive additive were dispersed in a solution of N-methylpyrolidone in which, as binder, 8 parts by weight of PVDF, 0.1 parts by weight of the acrylic polymer as defined above and and 0.2 parts by weight of diisopropylperoxydicarbonate were dissolved to obtain a slurry (paste). The slurry was heated in a closed system to prevent solvent evaporation at 80° C. for 30 minutes and then was coated on both sides of a aluminum foil of 20 μ thickness, dried at 120° C. under reduced pressure and then press-moulded to obtain a cathode of 160 μ thickness and of 20 mm width.

A good adhesion between these electrodes and the electrode activator was noted: each electrode activator remains on the electrode surfaces when the electrode activators deposited on the electrodes were peeled off by a cutter-knife. A cell was manufactured by the same method as in Example 1 and the same charge-discharge test was effected. The results revealed that the capacity of discharge after 150 cycles was 93% of a value of 10th cycle.

Example 3

The procedure of Example 1 was repeated but the grafted PVDF of Preparation Example 2 was used.

A good adhesion between these electrodes and the electrode activator was noted: the electrode activator remains on the electrode surfaces when the electrode activators deposited on the electrodes were peeled off by a cutter-knife. A cell was manufactured by the same method as Example 1 and the same charge-discharge test was effected. The results revealed that the capacity of discharge after 150 cycles was 92% of a value of 10th cycle.

Example 4

The procedure of Example 1 was repeated but the grafted PVDF of Preparation Example 3 was used.

A good adhesion between these electrodes and the electrode activator was noted: the electrode activator remains on the electrode surfaces when the electrode activators deposited on the electrodes were peeled off by a cutter-knife. A cell was manufactured by the same method as Example 1 and the same charge-discharge test was effected. Results revealed that the capacity of discharge after 150 cycles was 95% of a value of 10th cycle.

Comparative Example 1

The same procedure as Example 1 was repeated but PVDF Kynar500 was used.

When carbon pitch coke deposited on electrode was peeled off by a cutter-knife, substantially no electrode activator remains on a surface of the copper electrode. A cell was prepared by using the resulting electrode in the same manner as Example 1 to find that the capacity of discharge after 100 cycles was 50% of a value of 10th cycle.

Comparative Example 2

The same procedure as Example 2 was repeated but no peroxide was added to the slurry for the manufacture of both anode and cathode with the same procedure as in Example 1.

When carbon pitch coke deposited on the electrode was peeled off by a cutter-knife, it was recognized that a substantial part of the electrode activator remains on a surface of copper electrode. A cell was prepared by using the resulting electrode in the same manner as Example 1. Its capacity of discharge after 150 cycles was 55% of a value of 10th cycle.

What is claimed is:

1. Electrode for cell comprising a layer of an electrode-forming substance comprising an electrode activator and a binder coated or bonded to a surface of a collector, characterized in that the binder is a fluoroplastic grafted with at least one acryl polymer consisting mainly of at least one monomer unit selected from esters of acrylic acid and/or methacrylic acid and that the content of said acryl polymer is 0.1 to 20% by weight of said binder.

2. Electrode according to claim 1, wherein said fluoroplastic is a polyvinylidenefluoride resin.

3. Electrode according to claim 2, wherein the polyvinylidenefluoride resin is a polyinylidenefluoride homopolymer.

4. Electrode according to claim 2, wherein the polyvinylidenefluoride resin is a copolymer of vinylidenefluoride and at least one monomer selected from the group comprising tetrafluoroethylene, hexafluoropropylene, trifluoroethylene and/or chlorotrifluoroethylene, the proportion of vinyidenefluoride in the copolymer being more than 40% by weight.

5. Electrode according to claim 2, wherein the polyvinylidenefluoride resin is a mixture of a polyvinylidenefluoride homopolymer and a copolymer of vinylidenefluoride and at least one monomer selected from the group comprising tetrafluoroethylene, hexafluoropropylene, trifluoroethylene and/or chlorotrifluoroethylene, the proportion of vinylidenefluoride in the copolymer being from 50 to 95% by weight.

6. Electrode according to claim 1, wherein the acrylic polymer comprises 0.5 to 20% by weight of at least one monomer having carboxylic acid and/or carboxylic anhydride group.

7. The electrode according to claim 1, wherein the content of said acrylic polymer is 0.3 to 5% by weight.

8. A method for producing an electrode for cell comprising a layer of an electrode-forming substance comprising an electrode activator and a binder coated or bonded to a surface of a collector, wherein the binder is a fluoroplastic grafted with at least one acryl polymer consisting mainly of at least one monomer unit selected from esters of acrylic acid and/or methacrylic acid and that the content of said acryl polymer is 0.1 to 20% by weight of said binder, comprising the steps of:

(a) obtaining the binder by graft reaction of the acrylic polymer(s) and the fluoroplastic in the presence of peroxide(s);

(b) kneading the binder with the electrode activator in the presence of a solvent to prepare a slurry;

(c) applying the slurry onto the surface of a collector; and (d) drying the slurry applied in step (c).

9. A method for producing an electrode for cell comprising a layer of an electrode-forming substance comprising an electrode activator and a binder coated or bonded to a surface of a collector, wherein the binder is a fluoroplastic grafted with one or more acryl polymers consisting mainly of at least one monomer unit selected from esters of acrylic acid and/or methacrylic acid and that the content of said acryl polymers is 0.1 to 20% by weight of said binder comprising the steps of:

(a) preparing a slurry from fluorinated monomers, peroxide(s), the acrylic polymer(s) and a solvent;

(b) heating the slurry to a temperature suitable for the polymerization and the graft reactions of the fluoroplastic, and (c) coating the slurry obtained in step (a) onto a collector.

10. A method for producing an electrode for cell comprising a layer of an electrode-forming substance comprising an electrode activator and a binder coated or bonded to a surface of a collector, wherein the binder is a fluoroplastic grafted with one or more acryl polymers consisting mainly of at least one monomer unit selected from esters of acrylic acid and/or methacrylic acid and that the content of said acryl polymer is 0.1 to 20% by weight of said binder comprising the steps of:

(a) preparing a slurry of fluorinated monomers, peroxide(s). the acrylic polymer(s) and a solvent;

(b) coating the slurry obtained in step (a) onto a collector; and (c) heating the slurry-coated collector obtained in step (b) to a temperature suitable for polymerization and graft reaction of the fluoroplastic.

11. A method for producing an electrode for cell comprising a layer of an electrode-forming substance comprising an electrode activator and a binder coated or bonded to a surface of a collector, wherein the binder is a fluoroplastic grafted with one or more acryl polymers consisting mainly of at least one monomer unit selected from esters of acrylic acid and/or methacrylic acid and that the content of said acryl polymer is 0.1 to 20% by weight of said binder comprising the step of:

(a) obtaining the binder using means of radiation to cause graft reaction of acrylic polymer(s) and the fluoroplastic.

* * * * *